US005759253A

United States Patent [19]

Young

[11] Patent Number: 5,759,253
[45] Date of Patent: Jun. 2, 1998

[54] LIGHTWEIGHT AGGREGATE AND PROCESS FOR ITS PRODUCTION

[75] Inventor: Rom D. Young, Dallas, Tex.

[73] Assignee: Texas Industries, Inc., Dallas, Tex.

[21] Appl. No.: 760,030

[22] Filed: Dec. 4, 1996

[51] Int. Cl.$^6$ ........................................ C08K 7/24
[52] U.S. Cl. .................. 106/409; 106/401; 106/483; 428/403; 428/404; 428/323; 502/263
[58] Field of Search .................... 106/409, 405, 106/401, 483, 486; 428/403, 404, 406, 323; 427/215, 216, 217, 218; 502/240, 263

[56] References Cited

U.S. PATENT DOCUMENTS

| | | | |
|---|---|---|---|
| 2,035,845 | 3/1936 | Stanton | 25/156 |
| 2,046,071 | 6/1936 | Harding | 25/155 |
| 2,463,994 | 3/1949 | Nichols et al. | 25/158 |
| 2,981,636 | 4/1961 | Lodge et al. | 117/70 |
| 3,143,789 | 8/1964 | Iler et al. | 29/182.5 |
| 4,143,202 | 3/1979 | Tseng et al. | 428/406 |
| 4,238,242 | 12/1980 | Park | 106/288 B |
| 4,351,670 | 9/1982 | Grice | 106/88 |
| 4,469,517 | 9/1984 | Cooke, Jr. | 106/38.3 |
| 4,775,592 | 10/1988 | Akahane et al. | 428/406 |
| 4,792,358 | 12/1988 | Kimura et al. | 106/84 |
| 5,168,307 | 12/1992 | Frye | 432/14 |
| 5,314,744 | 5/1994 | Walter et al. | 428/326 |
| 5,376,171 | 12/1994 | Frye | 106/486 |
| 5,531,824 | 7/1996 | Burkes et al. | 106/737 |

FOREIGN PATENT DOCUMENTS

405229858 A   9/1993   Japan .

*Primary Examiner*—Michael Marcheschi
*Attorney, Agent, or Firm*—Jones, Day, Reavis & Pogue

[57] ABSTRACT

A lightweight aggregate and a process and apparatus by which FCC, petroleum equilibrium fluid-cracking catalyst, a by-product of the oil refinery industry, can be added to the feedstock materials fed into the feed end of a rotary lightweight aggregate kiln or blown into the discharge end of the same kiln by insufflation, or by a combination of both techniques, to form the lightweight aggregate utilizing the FCC as received without further processing.

5 Claims, 1 Drawing Sheet

A — BASE GRANULE
B — SILICATE COATING
C — PORES

LIGHTWEIGHT AGGREGATE AND PROCESS FOR ITS PRODUCTION

BACKGROUND OF THE INVENTION

1. Field of the Invention

This invention relates in general to the manufacture of lightweight aggregate in long rotary kilns. In particular, the invention relates to a method and apparatus for the manufacture of lightweight aggregate in conventional long rotary kilns wherein fluid-cracking catalyst (FCC) is insufflated into the discharge end of the rotary kiln or is added at the input or feed end of the rotary kiln with a stream of conventional feedstock, and eventually discharges at the heat end of the kiln. The FCC equilibrium catalyst provides a hard surface for the lightweight aggregate, along with other quality and production improvements.

2. Description of Related Art Including Information Disclosed Under 37 CRF 1.97 and 1.98

As stated in U.S. Pat. No. 2,035,845, the literature is replete with processes by which ceramic aggregate is produced from clays and shales subjected to high temperature in a rotary kiln. The typical process using a rotary kiln is well known. Lightweight aggregate raw materials, such as clays and shales or slate, are crushed (sometimes extruded) and screened to produce proper aggregate size.

It is known to produce a ceramic clay aggregate which is relatively light in weight. Such aggregate can be used in cement and concrete materials used in construction. Several procedures are known for making such lightweight aggregate. See U.S. Pat. No. 5,169,307, 4,351,670, 4,238,242, 2,463,994, and 2,046,071. The essential elements of these lightweight aggregates are that they have partially, or to a greater or lesser extent, hollow interiors having vesicles, cells, and gas filled bubbles comprising their interior portions and a hard, solid, strong, generally spherical, nonvesiculated waterproof outer coating or shell. Thus, the vesiculated interior makes the aggregate lightweight because of the open spaces or pores therein and the outer coating is impervious to moisture and adds strength to the aggregate.

The rotary kiln is tipped downward at such an angle that the heat end of the kiln is below the feed or input end of the kiln. The kiln has generally four operating temperature zones—a drying zone, a bloating zone, a ceramic producing zone, and a cooling zone. Conventional fuel is injected into the kiln at the heat end of a rotary kiln. Fuels, such as natural gas and oil or powdered coal, are conventionally employed in the lightweight aggregate manufacturing process.

As the raw materials pass into the rotating kiln at the feed end thereof and, in some instances, injected into the discharge end of the rotary kiln, the materials are heated from near ambient temperature to a temperature of incipient fusion, whereby the edges of raw materials begin to melt, causing particles to fuse together. The temperature of incipient fusion varies, depending on the raw material used in the manufacture of lightweight aggregate, with the normal range of temperature being 950° C. (1700° F.) to 1370° C. (2500° F.).

It is at this temperature of incipient infusion that raw materials become pyro-plastic, a void structure is formed from evolving gases, volume and density of materials is established, and ceramic compounds are formed. To produce lightweight aggregate, the raw materials are expanded to about twice their original volume. The expanded material has similar properties to natural aggregate, but has the advantage of being less dense and, therefore, yields a lighter concrete product.

Lightweight aggregate (LWA) has many applications, such as replacement of normal weight aggregates in concrete for roads and bridges, concrete buildings, thermal aggregates in concrete for roads and bridges, concrete buildings, thermal insulating, soil conditioning, backfill material, and asphaltic concrete, to name a few.

The Characteristics and Advantages of LWA Over Standard Concrete:

- LWA produces concrete which weighs one-third less than normal sand and gravel concrete.
- Concrete made with LWA produces compressive strengths equal to normal concrete with the same cement content.
- The ease of handling, transporting, placing, and finishing LWA lowers labor costs.
- Reduction of deadload achieved with the use of LWA permits substantial savings.
- Minimal shrinkage, cracking, and warping occur because of good gradation and low absorption.
- In numerous refractory applications where LWA is used with alumina cement, it performs at temperatures up to 2000° F. The thermal conductance of LWA is one-fourth that of heavy aggregate concrete.
- The cellular interior of the individual aggregate particles provides improved sound and heat insulating qualities in LWA concrete.
- Concrete block manufacturers using LWA produce uniformly textured lightweight blocks of the highest quality that weigh up to 50 percent less than normal concrete blocks. The blocks, which are non-staining and non-corrosive, may take on many shapes and patterns. The pleasing, natural finish is also an excellent plaster, stucco, or paint base.

In U.S. Pat. No. 5,531,824, a process is disclosed whereby the hardness and compressive strength of concrete are increased and the permeability to liquids is decreased by allowing a hard, impervious, alkali metal aluminum silicate layer to form in the pores of specially formulated concrete.

Thus, it is known that aluminum silicate is a very hard material and, as stated in the U.S. Pat. No. 5,531,824, the alkali metal aluminum silicate layer is actually formed in the pores of the concrete to increase its strength.

Another material has been discovered that can be used in addition and in combination with the basic raw materials for lightweight aggregate production, with increased production and improved quality of the lightweight aggregate. The additional material is the waste or by-product of the oil refinery industry and is known as FCC, petroleum equilibrium fluid-cracking catalyst, and will be referred to as an "FCC catalyst" in this application.

Further, the FCC catalyst has been found to be mainly an aluminum silicate compound with ceramic quality, very hard and durable, and is a compound similar to LWA chemical compounds. The energy to form aluminum silicate in the FCC catalyst was provided during the production of the FCC catalyst.

Applicant's experience has shown the FCC catalyst to have no deleterious effect on the operation of a LWA kiln. Emission of volatile materials from the kiln are improved over the prior art because the FCC catalyst has previously been heat treated and most volatile materials have been removed. No additional processing of the FCC catalyst is required (i.e. crushing, grinding, etc.). It is added to the LWA aggregate process as received from the oil refining industry.

Because it is recognized that some of the chemical compounds in FCC catalyst are common to LWA chemical compounds and, because waste FCC catalyst is available in large quantities and presents a major disposal problem, it would be advantageous to be able to use FCC catalyst in the LWA-making process, as received from the petroleum industry with no further processing.

SUMMARY OF THE INVENTION

The present invention provides such use of waste FCC catalyst and provides a method and apparatus for utilization of FCC catalyst as received from the petroleum refinery, obtaining all the advantages of the use of a waste material along with product improvement without the disadvantage of the requirement of further processing of a material (i.e. quarry, crushing, or screening).

As stated previously, applicant's experience has shown FCC catalyst to have no deleterious effect on the operation of a LWA aggregate kiln. Emission of volatile materials from the rotary kiln is improved, because the FCC catalyst has previously been heat treated, and most volatile materials have been removed (i.e. carbon dioxide, carbon, volatile organics, and the like), which are considered greenhouse contaminates. Because of the previous history of the FCC catalyst, the required FCC catalyst chemistry has already been achieved during the manufacture of the FCC catalyst, thus conserving energy in the LWA making process.

There are a number of advantages of the use of FCC catalyst. First, no fine grinding or pulverizing of FCC catalyst is required. Large quantities of FCC catalyst can be incorporated in the LWA composition with no changes to the basic raw material composition.

Second, no drying of FCC catalyst is required. Inherent moisture is normally less than ½%. Basic raw material usually contains 5% to 20% inherent moisture; therefore, FCC catalyst conserves the considerable energy needed to dry the materials it replaces.

Third, no buildup on the kiln lining has been experienced, and reduced logging of natural materials has been experienced—which is a tremendous advantage, making the burning process much easier. Logging inside a LWA kiln happens when clays and shales are overheated and aggregate particles stick together excessively, resulting in material waste and equipment down time, if not brought under control. FCC catalyst prevents this agglomeration as it forms a hard shell on aggregate particles making the outer shell less sticky. This advantage allows production of a wider weight range of LWA. This can have several advantages in the LWA market, such as lighter weight aggregate, and less mass per cubic foot of aggregate, which will save on freight, create new markets, etc.

Fourth, as the FCC catalyst forms an outer hard layer on the shale, slate, or clay particle used as the primary material, this outer layer is much harder than the inner core of the aggregate particle, making the LWA highly wear resistant.

It is known that bauxite aggregate, which is essentially calcined aluminum silicate, essentially the same as FCC catalyst, is one of the hardest aggregates known to man, as well as being highly chemical resistant and heat resistant.

Fifth, production increases are almost proportional to the amount of FCC catalyst utilized.

Sixth, the environmental condition of the rotary kiln process improves because of the low volatile content of the FCC catalyst.

Seventh, recycling of the FCC catalyst improves the environment and the present invention provides an important use for the large quantities of FCC catalyst available, and disposal of FCC catalyst presents a problem.

Eighth, the cost of LWA production is substantially reduced, because of the energy savings and the plentiful supply of FCC catalyst.

Thus it is an object of the present invention to provide an improved method and apparatus for the production of LWA, using a rotary kiln and using FCC catalyst, a by-product of the petroleum refining process.

It is also an object of the present invention to produce a lightweight aggregate having improved properties.

It is still another object of the present invention to produce an improved lightweight aggregate by introducing FCC catalyst into a LWA rotary kiln at the feed end thereof with other feedstock material, or at the discharge end thereof by insufflation, or a combination of the two methods, whichever is more appropriate for various LWA processes.

It is a further object of the present invention to disclose apparatus for forming an improved lightweight aggregate using FCC catalyst.

Thus the present invention relates to a method of LWA manufacture, using an elongated rotary LWA kiln having a feed end and a heat end, the heat end being tilted downwardly with respect to the feed end, the method comprising the steps of directing heat from a heat source into the heat end of the kiln, introducing a feedstock material containing clays or shale or slate into the feed end of the rotary kiln, such that the stream of feedstock material moves toward the heat at the heat end of the kiln, and adding a predetermined amount of FCC catalyst (as received from an oil refinery) to the feed end with the feedstock or injecting it into the heat end of the rotary kiln by an insufflation method, such that as the stream of feedstock material and FCC catalyst moves toward the heat end of the kiln, the FCC catalyst is fused to the outer surface of the feedstock particles to form an outer layer of hard, inert material on the LWA. Various percentages of FCC catalyst can be utilized, up to 75% of the weight of the feedstock.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which.

DETAILED DESCRIPTION OF THE PREFERRED EMBODIMENTS

Figure 1:
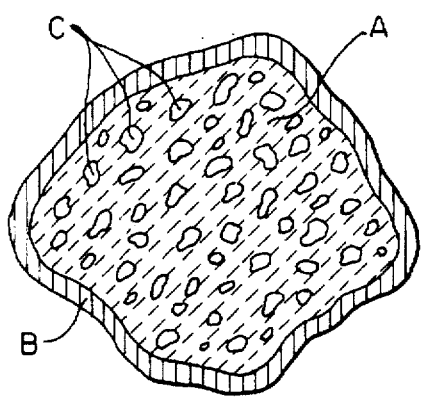
FIG. 1 is a cross-sectional representation of a lightweight aggregate formed by the method and apparatus of the present invention.

The present invention allows FCC catalyst to be added to the rotary kiln basic feedstock material at the feed end of the LWA rotary kiln. Most FCC catalyst is composed of particles, most of which are smaller than 0.033 inches (881 microns) as received from the petroleum refinery. Therefore, no further processing or screening is required.

The invention provides a method of utilization of FCC catalyst as received, as a petroleum refinery waste, in the LWA rotary kiln processes, which allow the elements and chemical compounds of the FCC catalyst (see Table I) to become a desired coating on a particle of LWA. It is to be noted from Table I that FCC catalyst is composed predominantly of silicon dioxide ($SiO_2$) and alumina ($Al_2O_3$). This composition is very similar to that comprising conventional LWA.

TABLE I

| CHEMICAL ANALYSIS FCC CATALYST | |
|---|---|
| SiO2 | 62.66 |
| Al2O3 | 37.04 |
| Fe2O3 | 0.24 |
| CaO | 0.20 |
| MgO | 0.03 |
| P2O5 | 0.25 |
| TiO2 | 1.57 |
| Mn2O3 | 0.00 |
| K2O | 0.11 |

The LWA particle coating in this invention produces a very lightweight vesicular aggregate for the construction industry that has a very hard and durable surface and, at the same time, utilizes FCC catalyst (waste) in its manufacture.

Further, the use of FCC reduces the moisture content of the feedstock per unit of LWA produced proportional to the amount of FCC catalyst added to feedstock. This moisture reduction substantially reduces the energy required per unit of LWA production, thus reducing production costs.

As indicated earlier in relation to Table I, the chemical analysis of the FCC catalyst shows high concentration of silicon dioxide and alumina.

It has been found that when FCC is combined with typical feedstock material at the feed end of the of the kiln, the feedstock material begins to form lightweight aggregate intermediates prior to the FCC reaching the proper temperature to coat and fuse to the LWA intermediates. The lightweight aggregate forms in a rotary kiln at temperatures up to the normal maximum temperature of 2500° F. depending upon the feed stockmaterial used. The FCC fuses an aluminum silicate coating on the aggregate that is extremely hard and increases the crushing strength of the lightweight aggregate.

Thus the lightweight aggregate intermediates with vesicular interiors are formed first, at a temperature lower than the temperature at which the FCC is modified to allow it to coat and adhere to the LWA intermediates.

Table II illustrates a catalyst test of a control lightweight aggregate (as normally produced) compared to the same control lightweight aggregate with 20% FCC added, with 30% FCC added, and with 40% FCC added. Note that in all cases the silicon dioxide and the alumina remained in relatively high concentrations.

TABLE II

| CATALYST TEST - L.W.A. AT 20%, 30%, & 40% FCC CATALYST ADDITIONS | | | | |
|---|---|---|---|---|
| | CONTROL | 20% | 30% | 40% |
| SiO2 | 73.48 | 70.15 | 69.69 | 71.52 |
| Al2O3 | 16.10 | 16.46 | 16.56 | 16.35 |
| Fe2O3 | 5.29 | 5.33 | 5.35 | 5.17 |
| CaO | 2.72 | 0.74 | 0.76 | 0.62 |
| MgO | — | 1.16 | 1.13 | 1.06 |
| P2O5 | 0.07 | 0.11 | 0.11 | 0.11 |
| TiO2 | 0.79 | 0.96 | 0.89 | 0.91 |
| Mn2O3 | 0.09 | 0.05 | 0.07 | 0.03 |
| K2O | 1.33 | 1.25 | 1.19 | 1.20 |
| Total | 99.87 | 96.21 | 95.75 | 96.97 |

A typical nodule for the lightweight aggregate is shown in FIG. 1 wherein the base granule or intermediate A has a vesicular interior having multiple pores C which cause the intermediate to be very lightweight. When the feedstock materials are conveyed into the interior of a rotary kiln and aluminum silicate or FCC is conveyed to the interior of the kiln, at the operating temperatures of the kiln, well known in the art, the FCC or aluminum silicate coats, fuses to, and completely covers all of the intermediates individually to form a solid outer shell with a crushing strength that is at least about 6% greater than the crushing strength of the intermediates themselves. The coating or outer shell is shown by the letter B in FIG. 1.

Figure 2:
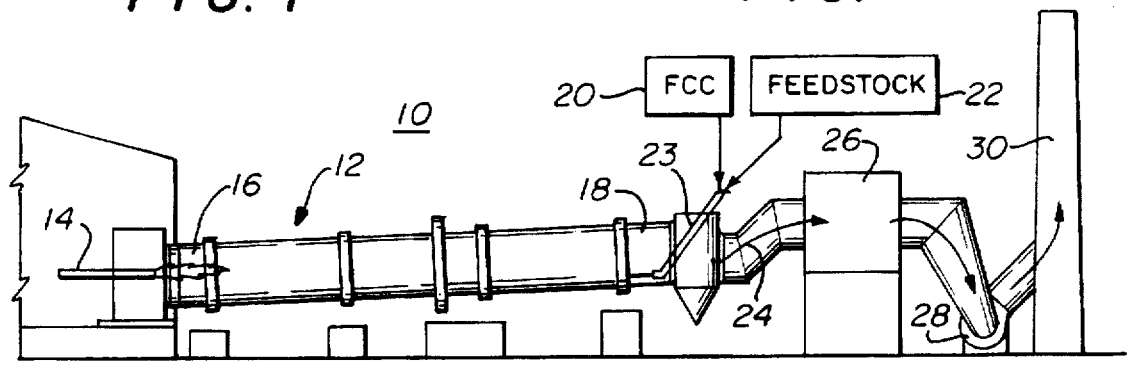
FIG. 2 is a basic diagrammatic representation of a rotary kiln system of the present invention for forming LWA in which the feedstock material and the FCC catalyst are fed together into the input end of the rotary kiln.

The apparatus providing the lightweight aggregate shown in FIG. 1 is illustrated in FIG. 2. The apparatus 10 comprises a rotary kiln 12 having a feed end 18 and a heat end 16 where a burner pipe 14 provides a gas or other energy source to heat the interior of the kiln 12. At the feed end 18, a first storage and conveying means 22 feeds typical feedstock material into the rotating kiln. A second storage and conveying means feeds an aluminum silicate compound 20 such as FCC in the rotary kiln to bond an aluminum silicate outer layer on and completely cover all of the intermediate particles or granules individually that are formed in the well-known process so as to create an outer shell and form the lightweight aggregate with a crushing strength that is at least about 6% greater than the crushing strength of the intermediates alone. Gases 24 that are generated during the process are passed through a dust collector system 26 by a fan 28 and forced out at chimney 30.

It will be clear to one skilled in the art that the FCC 20 and the feedstock 22 in FIG. 2 could be fed separately into the interior of the feed end 18 of the rotary kiln 12 instead of being fed in a common pipe or conduit 23 into the interior of the rotating kiln at the feed end 18 as shown in FIG. 2.

Figure 3:
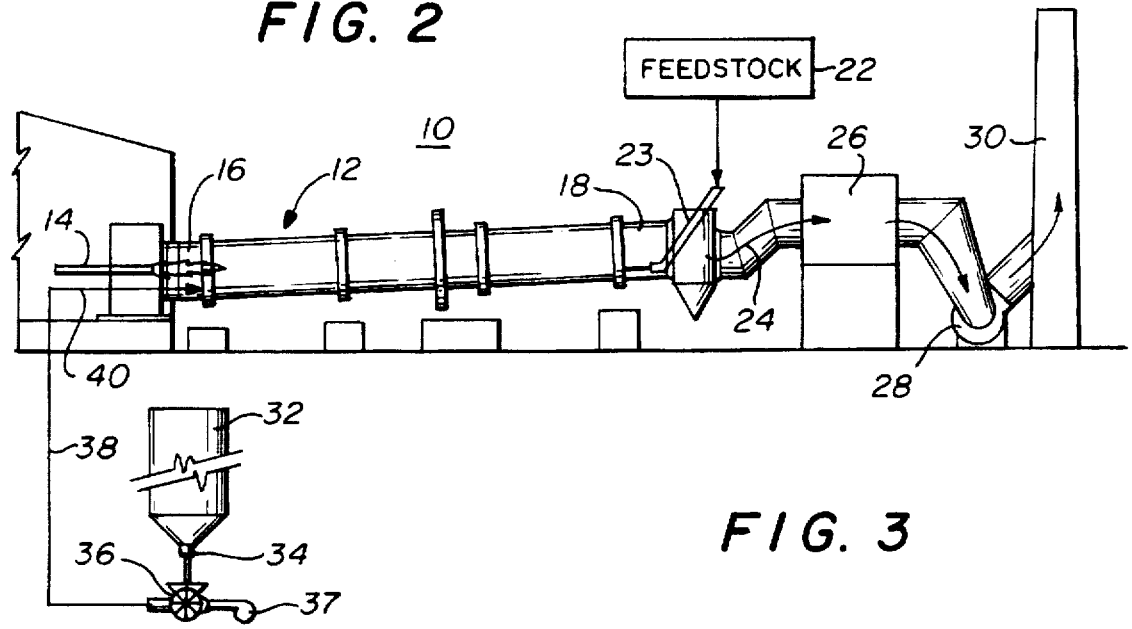
FIG. 3 is a basic diagrammatic representation of a rotary kiln system of the present invention for forming LWA in which the feedstock material is fed into the input end of a rotary kiln and the FCC catalyst material is insufflated into the heat or discharge end of the rotary kiln.

FIG. 3 illustrates an alternate apparatus for forming the lightweight aggregate wherein the FCC is injected into the rotary kiln 12 at the heat end 16 thereof. Thus, in FIG. 3, the FCC is stored in tank 32 and passes through a variable flow feeder 34 to a pneumatic feeder 36 where a blower 37 forces the FCC through conduit 38 to the feed pipe 40 at the feed end 16 of the kiln 12 where the FCC is forced into the interior of the kiln 12 by insufflation.

Table III illustrates a well-known performance test of the lightweight aggregate of the present invention compared to the intermediate lightweight aggregate used as a control. Thus, as can be seen in Table III, the aggregate identified as "control" had a unit weight of 46 pounds per cubic foot. Under a first freeze/thaw test according to a government specification identified as "Spec. 1", three different sizes of the control aggregate designated Grade 3, Grade 4, and D show that for fifty cycles of freezing and thawing, 18.68% of Grade 3 aggregates flaked off after 50 cycles of freeze/thaw, 15.88% of grade 4 flaked off, and 13.04% of grade D flaked off. Further, according to a second test identified as "Spec. 2", the water absorption of the control aggregate in 24 hours was 16.8%. Finally, according to a third test designated as Spec. 3, when pressure was applied to the control aggregate in a well-known manner, 3.35% of the aggregate flaked off. As indicated, this is a well-known test in which the aggregate is placed under a given pressure and the percentage of material flaking off is measured.

TABLE III

PERFORMANCE TEST - LWA

| AGG. I.D. | UNIT WT. #/C.F. | SPEC. 1 50 CYL. FREEZE/THAW | | | SPEC. 2 Jan. '83 ABS % | SPEC. 3 Nov. '86 PRESSURE |
| --- | --- | --- | --- | --- | --- | --- |
| | | GRADE 3 | GRADE 4 | D | 24 Hr. | SLAKING |
| Control* | 46 | 18.68 | 15.88 | 13.04 | 16.8 | 3.35 |
| 20% FCC | 48 | 8.72 | 6.45 | 14.38 | 16.5 | 3.34 |
| 30% FCC | 46 | 4.08 | 2.33 | 2.08 | 14.5 | 3.27 |
| 40% FCC | 43 | 3.82 | 2.84 | 2.69 | 13.9 | 2.90 |

*Control is regular production of LWA without catalyst.
Note:
Essentially all categories - freeze/thaw, % absorption, and pressure slaking - show an improvement in product performance when FCC catalyst is used in the manufacture of LWA.

Notice in Table II that, when 20% FCC is added to the control aggregate, the unit weight was 48 pounds per cubic foot, with the 50 cycle freeze/thaw test showing a maximum of 14.38% flaking off for Grade D and a minimum of 6.45% flaking off for Grade 4. In addition, the water absorption test showed that 16.5% water was absorbed in 24 hours. Finally, under the pressure slaking test, 3.34% of the aggregate flaked off for the same test as applied to the control aggregate.

When 30% FCC was added to the control aggregate, the unit weight dropped to 46 pounds per cubic foot and an exceptional improvement occurred in the first test for freeze/thaw. The minimum percent of the aggregate that flaked off was 2.08% for Grade D and the maximum was 4.08% for grade 3. In addition, in the second test, 14.5% water was absorbed in 24 hours. In the third test, 3.27% of the aggregate flaked off under the same pressure test applied to the control aggregate and to the 20% FCC aggregate.

Finally, when 40% FCC was added to the control aggregate, the unit weight dropped to 43 pounds per cubic foot. In addition, in the first test for 50 cycles of freeze/thaw, the amount of material flaking off dropped to a minimum of 2.69% and a maximum of 3.82%. In addition, the water absorption dropped to 13.9% and the pressure slaking percent dropped to 2.9%. Thus, with the exception of the 20% FCC for unit weight and Grade D freeze/thaw test, all of the other FCC aggregates improved in quality and performance.

Tables IV, V, VI, and VII illustrate the result of the compression test for the control aggregate, the 20% FCC aggregate, the 30% FCC aggregate and the 40% FCC aggregate. The results are plotted in FIG. 4. Note that the average compression test in pounds per square inch for the control lightweight aggregate was 744 pounds per square inch.

AGGREGATES FOR CONCRETE

Particle Strength

TABLE 4

LWA Control

| Particle Size | | Compression | |
| --- | --- | --- | --- |
| Std. (inch) | Metric (mm) | lbf | psi |
| 3/4-#4 | 19.0-4.75 | 12010 | 779 |
| | | 10330 | 670 |
| | | 12040 | 781 |
| | Average | 11460 | 744 |

TABLE 5

20% FCC/LWA

| Particle Size | | Compression | |
| --- | --- | --- | --- |
| Std. (inch) | Metric (mm) | lbf | psi |
| 3/4-#4 | 19.0-4.75 | 12450 | 808 |
| | | 13220 | 858 |
| | | 10730 | 696 |
| | Average | 12133 | 787 |

TABLE 6

30% FCC/LWA

| Particle Size | | Compression | |
| --- | --- | --- | --- |
| Std. (inch) | Metric (mm) | lbf | psi |
| 3/4-#4 | 19.0-4.75 | 12440 | 807 |
| | | 13650 | 886 |
| | | 13300 | 863 |
| | Average | 13130 | 852 |

TABLE 7

40% FCC/LWA

| Particle Size | | Compression | |
| --- | --- | --- | --- |
| Std. (inch) | Metric (mm) | lbf | psi |
| 3/4-#4 | 19.0-4.75 | 12610 | 818 |
| | | 16000 | 1038 |
| | | 12920 | 838 |
| | Average | 13843 | 896 |

When 20% FCC was added to the control lightweight aggregate, the average compression test rose to 787 pounds per square inch. With 30% FCC added, the average for the compression test continues to rise to 852 pounds per square inch. Finally, when 40% FCC was added, the resulting compression test rose to 898 pounds per square inch.

Figure 4:
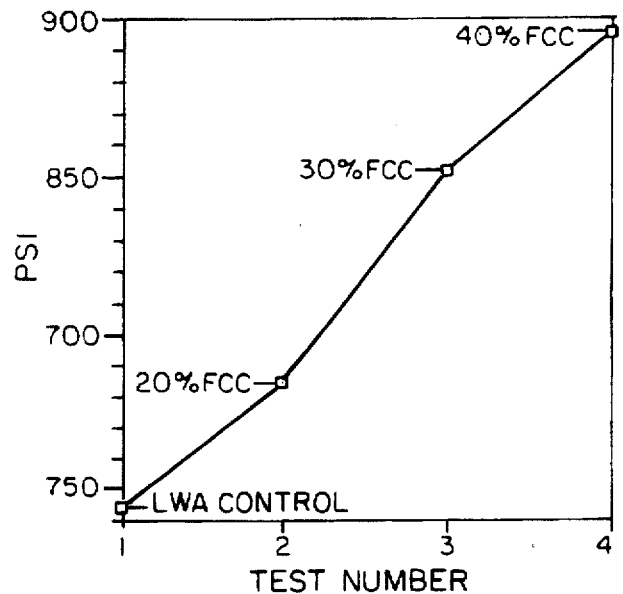
FIG. 4 is a graph in which results of pressure tests are shown for LWA formed a conventional or control LWA and for additional tests of LWA formed with FCC that is added in amounts of 20%, 30%, and 40%.

As stated, the results of these four tests are shown graphically in FIG. 4. Note that the improvement in the compression test is substantially linear with the addition of FCC. It is notes that the figures plotted are the average figures. To have a straight line correlation, the 20% FCC should have been at 795 pounds per square inch, which is within the range of compression tests applied to the 20% FCC as shown in Table V. In addition, at 30% FCC, for a linear increase, the pounds per square inch should have been 844, which is also in the range of the three tests taken for the 30% FCC as shown in Table VI. Thus, as can be seen in FIG. 4, the strength of the lightweight aggregate increases rapidly and essentially linearly with an increase in the addition of the FCC. The crushing strength of the LWA is, therefore, substantially proportional to the amount of aluminum silicate forming the outer shell. Tests have not yet been completed to determine what could be the ideal aggregate in terms of pounds per cubic foot, freeze/thawing, water absorption, and pressure slaking versus compression and psi.

Thus, it can be seen that the present invention forms a lightweight aggregate as shown in FIG. 1 consisting essentially of intermediates having vesicular interiors and an aluminum silicate outer layer formed on and completely covering all of the intermediate particles individually so as to create an outer shell and form the lightweight aggregate with a crushing strength that is, desirably, at least about 6% greater than the crushing strength of the intermediates. It will be noted in FIG. 4 (and Tables V–VII) that with 20% FCC, the average crushing strength or compression strength of the 20% FCC is approximately 5.8% greater than the control aggregate, the 30% FCC aggregate average crushing strength is approximately 14.5% greater than the control aggregate, and the 40% FCC aggregate crushing strength is about 20.4% greater than the control aggregate. Thus, the crushing strength of the lightweight aggregate is substantially proportional to the amount of FCC used to form the outer shell layer on the intermediates.

The invention discloses a method of manufacturing a lightweight aggregate from lightweight aggregate intermediates that has the steps of utilizing intermediates that have a vesicular interior and forming an aluminum silicate outer layer on and completely covering all of the intermediates individually so as to create an outer shell and form the lightweight aggregate with a crushing strength that is at least about 6% greater than the crushing strength of the intermediates alone. Of course, the process utilizes the fluid-cracking catalyst (FCC) to provide the aluminum silicate outer layer. In addition, the method includes the step of adjusting the crushing strength of the lightweight aggregate by varying the amount of FCC added thereto.

Finally, the invention discloses apparatus for forming a lightweight aggregate wherein a rotary kiln having a feed end and a heat end is associated with a first conveying means for feeding feedstock material into the feed end of the kiln. Second conveying means feeds an aluminum silicate compound into the rotating kiln to form an aluminum silicate outer layer on and completely covering substantially all of the formed intermediate particles individually so as to create an outer shell and form the lightweight aggregate with a crushing strength that is at least 6% greater than the crushing strength of the intermediates alone.

The second conveying means may feed the fluid-cracking catalyst (FCC) into the rotary kiln to provide the aluminum silicate. The FCC may be fed into the feed end of the rotary kiln or into the heat end of the rotary kiln by insufflation or in a combination thereof.

Thus, there has been disclosed a lightweight aggregate and a method and apparatus for the manufacture of the lightweight aggregate in conventional long rotary kilns wherein FCC catalyst is added to the interior of the kiln at the input or feed end or insufflated into the heat or discharge end of the rotary kiln and provides a hard surface for the formed aggregate intermediates along with other quality and production improvements.

The corresponding structures, materials, acts, and equivalents of all means or step plus function elements in the claims below are intended to include any structure, material, or act for performing the function in combination with other claimed elements as specifically claimed.

What is claimed is:

1. A lightweight aggregate consisting essentially of:

vesicular particles; and an outer shell of fluid-cracking catalyst (FCC) formed on and covering said vesicular particles individually so as to create an outer shell that provides said vesicular particles with a crushing strength that is greater than the crushing strength of the vesicular particles alone.

2. A lightweight aggregate as in claim 1 wherein the crushing strength of the lightweight aggregate is substantially proportional to the amount of FCC used to form the outer layer on the vesicular particles.

3. A method of manufacturing a lightweight aggregate comprising the steps of:

providing particles that have a vesicular structure; and coating a layer of fluid-cracking catalyst (FCC) on and completely covering said particles individually so as to create an outer shell that provides said coated particles with a crushing strength that is greater than the crushing strength of the particles alone.

4. The method of claim 3 further including the step of varying the amount of fluid-cracking catalyst (FCC) creating the outer shell of the particles to adjust the crushing strength of the lightweight aggregate.

5. An improved lightweight aggregate particle comprising:

a particle with a vesicular structure that has a crushing strength; and a coating of fluid-cracking catalyst (FCC) covering said vesicular structure to increase the crushing strength thereof.

* * * * *